United States Patent
Lu

(10) Patent No.: US 9,210,260 B2
(45) Date of Patent: Dec. 8, 2015

(54) CONTROLLING COMMUNICATIONS BETWEEN A MOBILE DEVICE AND A BASE STATION

(71) Applicant: QUALCOMM Incorporated, San Diego, CA (US)

(72) Inventor: Yuan Lu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 290 days.

(21) Appl. No.: 13/651,902

(22) Filed: Oct. 15, 2012

(65) Prior Publication Data

US 2014/0106724 A1     Apr. 17, 2014

(51) Int. Cl.
*H04M 3/42*     (2006.01)
*H04W 64/00*     (2009.01)
(Continued)

(52) U.S. Cl.
CPC ............ *H04M 3/42246* (2013.01); *H04M 3/00* (2013.01); *H04W 52/00* (2013.01); *H04W 64/006* (2013.01); *H04W 76/00* (2013.01); *H04M 2242/30* (2013.01)

(58) Field of Classification Search
CPC ....... H04W 24/00; H04W 76/00; H04W 4/02; H04W 8/08; H04W 64/00; H04W 48/04; H04W 60/00; H04W 36/32; H04W 40/20; H04W 76/02; H04W 76/021; H04W 4/00; H04W 64/006; H04W 52/00; H04W 88/06; H04W 88/10; H04W 4/023; H04M 3/00; H04M 1/00; H04M 2242/30; H04M 3/42246; H04M 1/72522; H04M 3/42; H04B 1/38; H04B 7/00

USPC ............................. 455/41.2, 404.2, 418–421, 455/456.1–456.2, 457–462, 465, 500, 507, 455/517, 525, 550.1, 556.2, 561, 573–574
See application file for complete search history.

(56) References Cited

U.S. PATENT DOCUMENTS 6,064,886 A * 5/2000 Perez et al. .................... 455/443
6,154,650 A * 11/2000 Abidi et al. .................... 455/433
(Continued)

FOREIGN PATENT DOCUMENTS

WO     2011129300     10/2011
WO     2014062685     4/2014

OTHER PUBLICATIONS

"PCT Application No. PCT/US2013/065066 International Search Report", Apr. 3, 2014, 8 pages.
(Continued)

*Primary Examiner* — Meless Zewdu
(74) *Attorney, Agent, or Firm* — DeLizio Law, PLLC

(57) ABSTRACT

Some embodiments of a telephone system and its operations are described herein. In some embodiments, the operations include establishing a communication link between a mobile device and a base station. The communication link enables an exchange of communications between the mobile device and the base station. The operations can further include detecting, at the base station via the communication link, initiation of a telephone call of the mobile device received via a mobile network. The operations can further include determining that the mobile device will be stationary during the telephone call. The operations can further include terminating location tracking of the mobile device within the mobile network during at least a portion of the telephone call in response to determination that the mobile device will be stationary during the telephone call.

25 Claims, 9 Drawing Sheets

(51) Int. Cl.
*H04M 3/00* (2006.01)
*H04W 52/00* (2009.01)
*H04W 76/00* (2009.01)

(56) References Cited

U.S. PATENT DOCUMENTS

| | | | |
|---|---|---|---|
| 6,178,326 B1 * | 1/2001 | Kalliokulju | 455/437 |
| 7,072,675 B1 | 7/2006 | Kanakubo | |
| 7,120,454 B1 | 10/2006 | Frank et al. | |
| 7,327,981 B2 | 2/2008 | Hundal | |
| 8,085,906 B2 * | 12/2011 | Park et al. | 379/87 |
| 8,238,902 B2 * | 8/2012 | Gustafson et al. | 455/426.1 |
| 8,812,025 B2 * | 8/2014 | Takahashi et al. | 455/456.1 |
| 2004/0152482 A1 * | 8/2004 | Raffel et al. | 455/522 |
| 2005/0070272 A1 | 3/2005 | Marangos | |
| 2006/0240817 A1 | 10/2006 | Akiyama et al. | |
| 2008/0139222 A1 * | 6/2008 | Falvo et al. | 455/456.3 |
| 2009/0111518 A1 * | 4/2009 | Agrawal et al. | 455/426.2 |
| 2009/0156188 A1 * | 6/2009 | Bychkov et al. | 455/417 |
| 2009/0267838 A1 * | 10/2009 | Khushu et al. | 342/450 |
| 2010/0113061 A1 * | 5/2010 | Holcman | 455/456.1 |
| 2010/0124921 A1 * | 5/2010 | Carmon | 455/426.1 |
| 2011/0143748 A1 * | 6/2011 | Shah et al. | 455/424 |
| 2012/0214513 A1 * | 8/2012 | Hashimoto et al. | 455/456.2 |
| 2012/0282925 A1 * | 11/2012 | Wehmeier et al. | 455/434 |

OTHER PUBLICATIONS

"118.122406WO International Preliminary Report on Patentability", Mar. 3, 2015, 6 pages.

* cited by examiner

CONTROLLING COMMUNICATIONS BETWEEN A MOBILE DEVICE AND A BASE STATION

BACKGROUND

Embodiments of the inventive subject matter generally relate to the field of communication systems and networks, and more particularly, to controlling communications between a mobile device and a base station.

Personal mobile devices ("mobile devices"), such as smartphones, personal digital assistants (PDAs), tablet computers, and so forth, are becoming more popular and more prevalent than ever. Mobile devices, however, have some drawbacks. For example, mobile devices run on batteries. If a mobile device runs out of battery power, or is low on power, then a user must plug in the device, thus limiting the mobile device's mobility while charging. Further, some mobile devices are capable of telephone communication. These mobile devices sometimes drop telephone calls or experience a reduction in network coverage. Moreover, in a localized setting, such as a setting where a user does not have to significantly move around (e.g., when the user is at home), or where the user has access to landline telephones, then use of a mobile device may become less advantageous. Therefore, there is a need to improve uses for mobile devices, such as in localized settings.

SUMMARY

Various embodiments of a telephone system and its operations are described herein. In some embodiments, the operations include establishing a communication link between a mobile device and a base station. The communication link enables an exchange of communications between the mobile device and the base station. The operations can further include detecting, at the base station via the communication link, initiation of a telephone call of the mobile device received via a mobile network. The operations can further include determining that the mobile device is stationary relative to the base station in response to detecting the initiation of the telephone call. The operations can further include terminating location tracking of the mobile device within the mobile network during at least a portion of the telephone call while the mobile device remains stationary relative to the base station.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to telephone communications, other examples may include video conferencing or other forms of person-to-person communications performed via a mobile device. In other instances, well-known instruction instances, protocols, structures and techniques have not been shown in detail in order not to obfuscate the description.

As described previously, there is a need to improve uses for mobile devices, such as when a user it at home. Some embodiments describe a base station for use in localized settings, such as at home. Some embodiments include establishing one or more communication links between one or more mobile devices and the base station and transferring, via the one or more communication links, information, such as telephone calls, internet data, mobile applications, etc. between the mobile device and the base station. In some embodiments, the base station broadcasts the information to handsets or other wireless devices linked with the base station.

Figure 1:
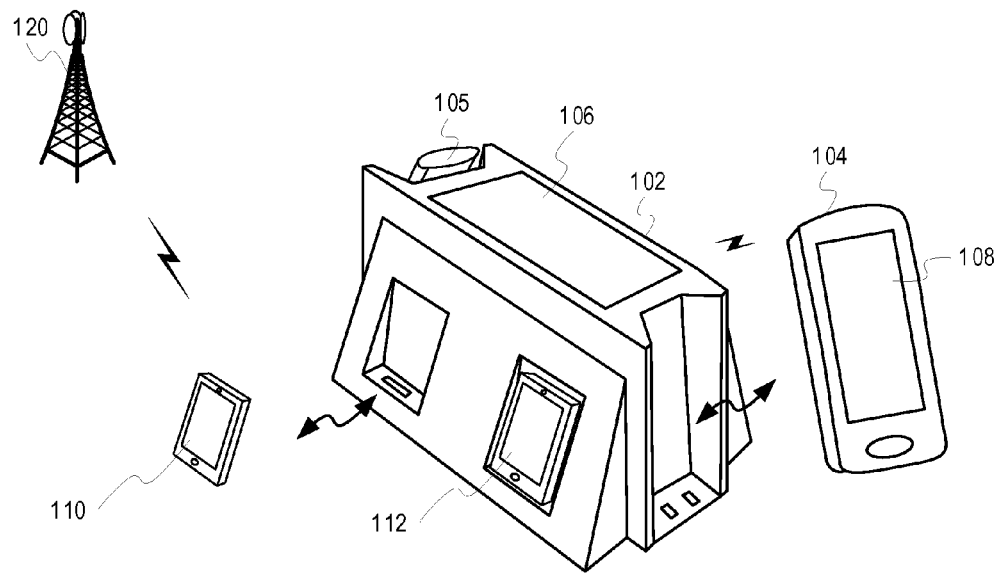
FIG. 1 is an example illustration of controlling communications between mobile devices and a base station.

FIG. 1 is an example illustration of controlling communications between mobile devices and a base station. In FIG. 1, a mobile device (e.g., mobile device 110 and/or 112) capable of exchanging communication data, such as for conducting telephone communications (e.g., cell phones, smart phones, etc.), is linked to a base station 102 (e.g., a cordless telephone base station or a corded telephone base station) via a communication link. The communication link enables an exchange of communications between the mobile device 110 or 112 and the base station 102. The base station 102 includes one or more cordless telephone handsets ("handset(s)") 104. While linked, any one of the mobile devices 110 or 112 communicates with the base station 102 via a wireless or wired communication link. After any of mobile device 110 or 112 are linked with the base station 102, when a telephone signal (e.g., an RF signal received from a mobile network tower 120) is sent to one of the mobile devices (e.g., to mobile device 110), the telephone call is automatically transferred from the mobile device (e.g., mobile device 110) to the base station 102 via the established communication link. The base station 102 receives the telephone call and causes the handset(s) 104 to indicate the incoming telephone call. The telephone call is transferred from the mobile device 110 to the base station 102 so that a user can use at least one of the handset(s) 104 for the telephone call instead of using the mobile device 110 which was the intended recipient of the telephone call.

The telephone call can be transferred to the base station 102 in a variety of ways. For example, in some embodiments, when the mobile device 110 receives the telephone call, the base station 102 can transfer the telephone call to another telephone line, such as a landline that is connected to the base station 102. In another example, the base station 102 utilizes one or more SIM cards within the base station 102 that are matched to a SIM card on the mobile device 110. When the mobile device 110 and base station 102 are linked, then telephone calls sent to the mobile device 110 (e.g., via the identification of the SIM card on the mobile device 110) are also received by the base station 102 (e.g., via a matching identification of the SIM card on the base station 102). In yet another example, the mobile device 110 transfers the telephone call to the base station 102 via Bluetooth®, or other wireless technology, thus enabling the mobile device 110 to be physically separate from the base station 102 (i.e., not physically docked with the base station 102). In some embodiments, however, the mobile device 110 is physically docked with the base station 102 (e.g., plugged into the base station 102) and, thus can communicate telecommunication data, and other types of data, through a direct physical connection.

In some embodiments, the base station 102 determines that the mobile device 110 is stationary during the telephone call. For example, the base station 102 can determine that the mobile device 110 is physically coupled, tethered with, or otherwise held in a stationary position relative to the base station 102. In some embodiments, when the mobile device 110 is stationary during a telephone call, the base station 102 and/or the mobile device 110 communicates with a mobile telephone service provider to indicate that the mobile device 110 is not moving locations. During a typical mobile telephone call, a portion of the communications between the mobile device 110 and the mobile telephone service provider includes continuous data communications that specify location updates of the mobile device 110 in relation to a mobile network tower 120 during the telephone call. In some implementations, these location updates can be used to focus the direction of the telephone signals. However, when the base station 102 and/or the mobile device 110 indicates to the mobile telephone service provider that the mobile device 110 is not in motion, and will not be in motion during the phone call, then the mobile device 110 and the mobile telephone service provider do not need to exchange the location updates. Consequently, network data traffic is reduced by eliminating the location updates during the telephone call. When the mobile device 110 becomes non-stationary relative to the base station 102 (e.g., is de-coupled physically from the base station 102 and/or begins to move relative to the base station 102), then the mobile device 110 and/or the base station 102 communicates with the mobile telephone service provider to resume communication of the location updates with the mobile device 110. Some additional description of controlling use of location tracking during a telephone call for stationary mobile devices is included in FIGS. 2, 3 and 4A-4B.

In some embodiments, the base station 102 can also provide internet access as a wireless hotspot, using internet data from either, or all, of the mobile devices 110 and 112 (i.e., using the mobile device 110 and/or 112 as internet access points). The base station 102 can utilize multiple data streams of data from the mobile devices 110 and 112 to increase the bandwidth of the internet data provided by the base station 102. Some additional description regarding providing internet access through a base station using one or more linked mobile devices is included in FIGS. 5 and 6.

In some embodiments, the base station 102 can use information, such as configuration data, application data, content, etc. from the mobile devices 110 and 112. For example, the base station 102 can use a ringtone sound file from the mobile device 110. The base station 102 can set an initial ring volume or conversation volume for the handset(s) 104 and 105 to volume levels set and stored within the mobile devices 110 and 112. In some examples, the base station 102 can access and utilize contact data, scheduling data, application data, or other information from the mobile devices 110 and 112. For example, the base station 102 can present any of the information from the mobile devices 110 and 112 via a user interface 106 of the base station 102 and/or via a user interface (e.g., interface 108) of the handset(s) 104 and 105. For example, when a user makes a telephone call using the handset 104, the base station 102 can present, via the user interface 106 or the user interface 108, any, or all, telephone contact data available from any of the mobile devices 110 and 112. Some additional description regarding using data from mobile devices via a base station is included in FIGS. 7 and 8.

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable storage media (e.g., software), while in other embodiments, the operations can be performed by hardware and/or other logic (e.g., firmware). Moreover, some embodiments can perform more or less than all the operations shown in any flow diagram.

Figure 2:
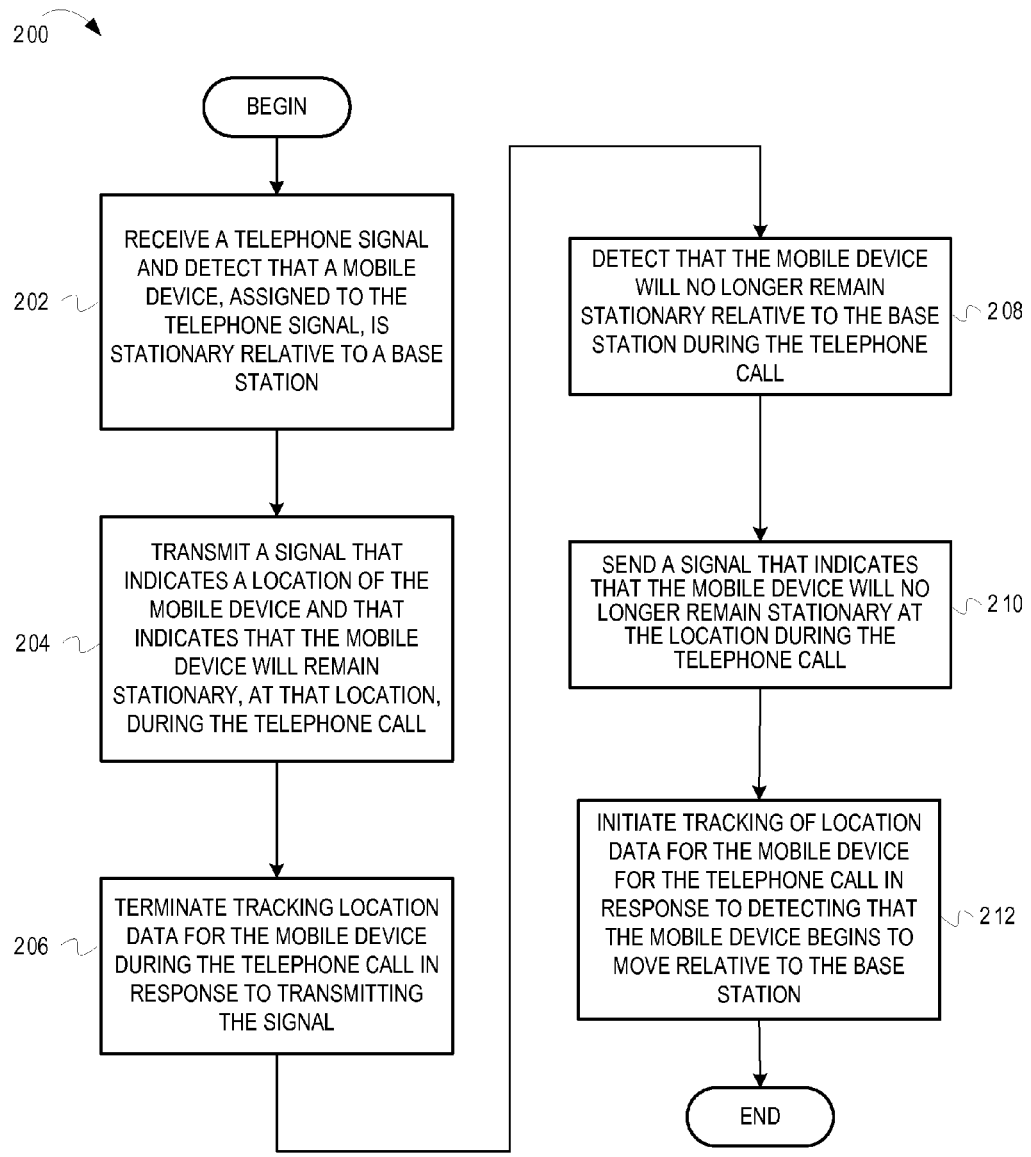
FIG. 2 is an example flow diagram illustrating controlling use of location tracking during a telephone call for docked mobile devices according to some embodiments.
Figure 3:
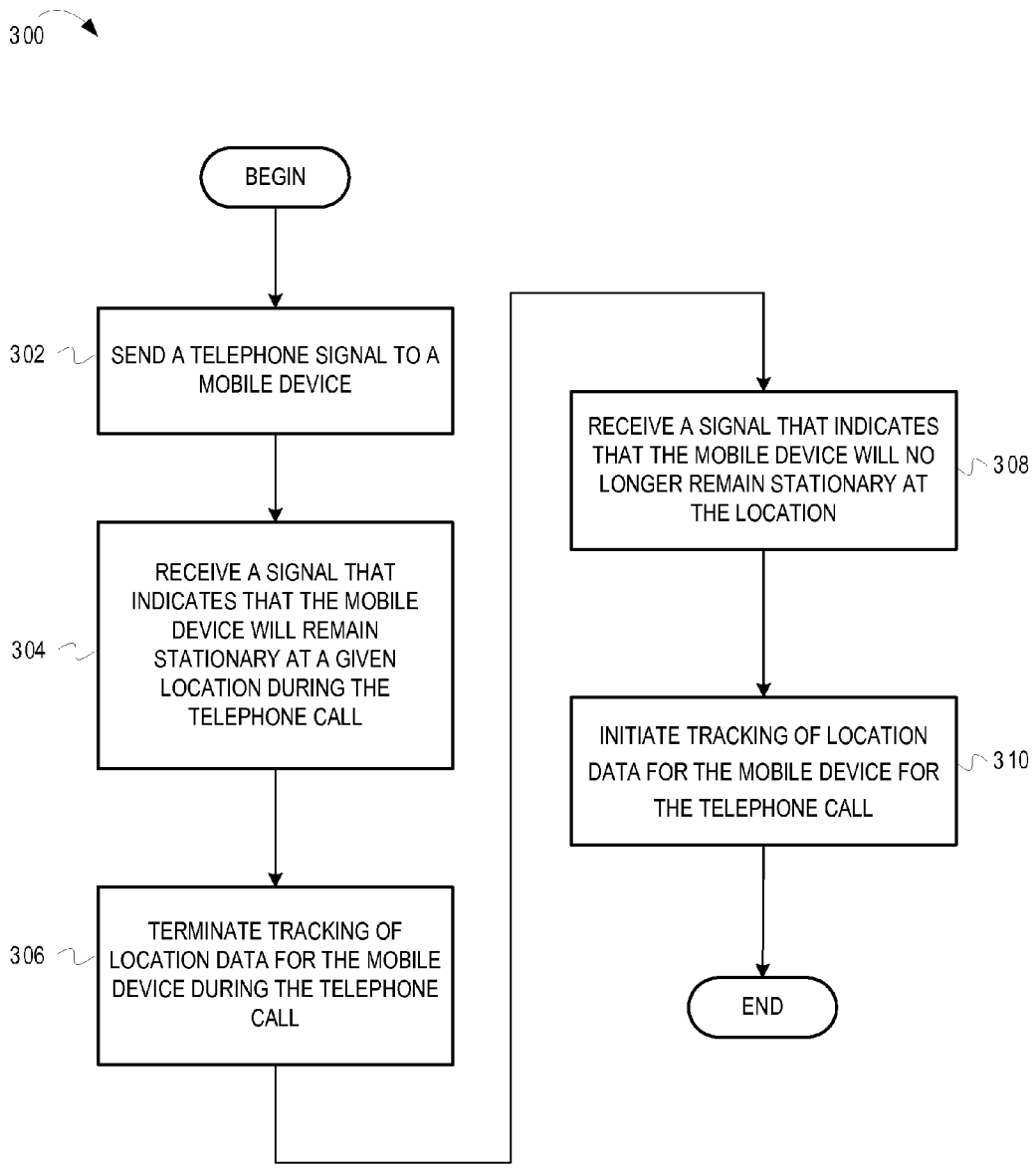
FIG. 3 is an example flow diagram illustrating controlling use of location tracking during a telephone call for docked mobile devices according to some embodiments.
Figure 4A:
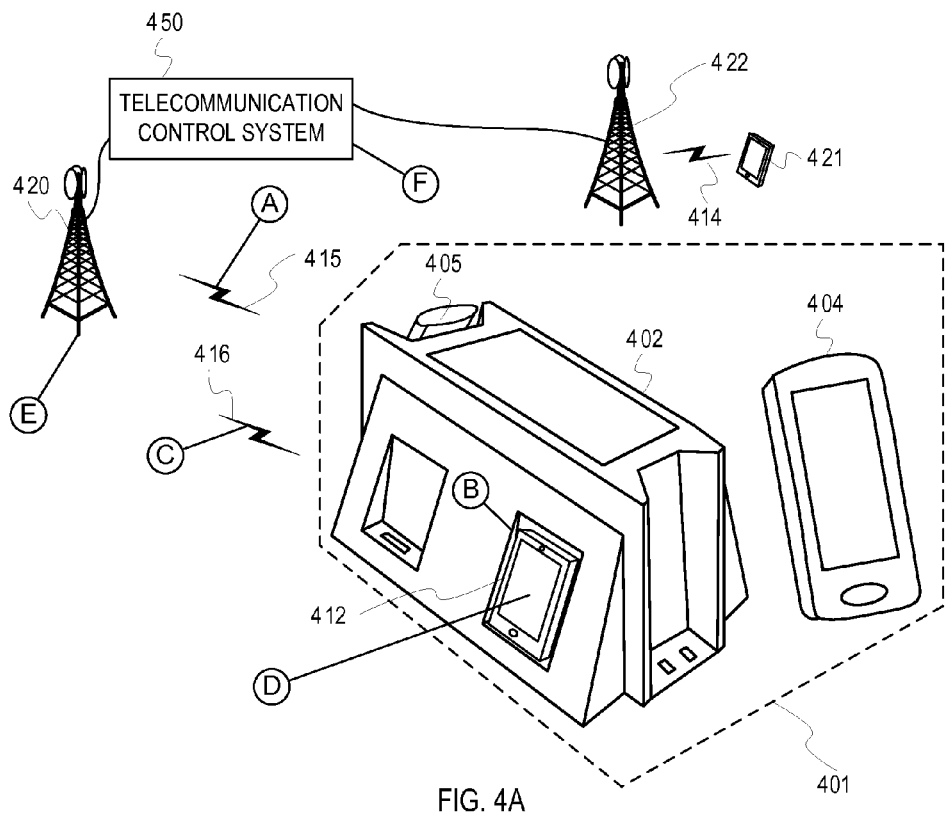
FIGS. 4A and 4B are example illustrations of controlling use of location tracking during a telephone call for docked mobile devices according to some embodiments.
Figure 4B:
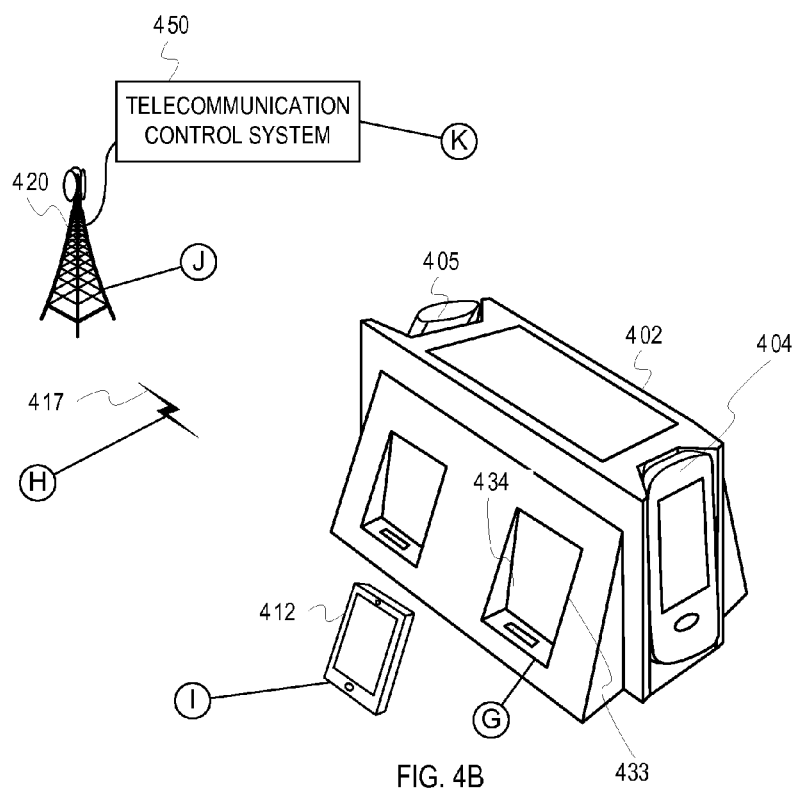

FIGS. 2 and 3 are example flow diagrams illustrating controlling use of location tracking during a telephone call for docked mobile devices according to some embodiments. A flow diagram ("flow") 200 illustrates operations performed by a first system (e.g., a cordless telephone system or a wireless telephone system). A flow diagram ("flow") 300 illustrates operations performed by a second system (e.g., a telecommunication control system, or "telecom system"). In some embodiments, flows 200 and 300 are performed concurrently, in an overlapping manner. In other embodiments, however, the flows 200 and 300 can be performed independently and at separate times in a way that does not overlap. FIGS. 4A and 4B are conceptual diagrams that illustrate the flows of FIGS. 2 and 3, according to some embodiments. This description will first present a brief description of FIG. 2 and then present a brief description of FIG. 3. This description will present FIGS. 4A and 4B as an example of a concurrent combination of flows 200 and 300.

In FIG. 2, the flow 200 begins at processing block 202, where a telephone system receives a telephone signal and detects that a mobile device, assigned to the telephone signal, is stationary relative to a base station. For example, the telephone system can detect that the mobile device is physically coupled, or fastened, to the base station. In some embodiments, the telephone system includes a cordless handset configured to communicate with a cordless telephone base station. However, in other embodiments, the flow 200 can be performed via a corded telephone system with a corded handset, or a combination of corded and cordless handsets.

The flow 200 continues at processing block 204, where the telephone system transmits a signal in response to detecting that the mobile device is stationary. The signal indicates a location of the mobile device. The signal also indicates that the mobile device will remain stationary, at that location, during the telephone call.

The flow 200 continues at processing block 206, where the telephone system terminates tracking of location data for the mobile device during the telephone call in response to transmitting the signal. For instance, the telephone system causes the mobile device to stop sending location data regarding its current location or movement. A specific example is described in FIGS. 4A-4B below.

The flow 200 continues at processing block 208, where the telephone system detects that the mobile device will no longer remain stationary relative to the base station during the telephone call. For instance, the telephone system can detect that the mobile device becomes disconnected from (e.g., physically uncoupled from) the base station. In another example, the telephone system determines that the mobile device begins to move relative to the base station.

The flow 200 continues at processing block 210, where the telephone system sends a signal that indicates that the mobile device will no longer remain stationary at the location during the telephone call. For example, the telephone system causes the mobile device to send a signal to a telecommunication control system to indicate that the mobile device is now moving and, therefore, will transmit its location to the telecommunication control system.

The flow 200 continues at processing block 212, where cordless telephone system initiates tracking of location data for the mobile device for the telephone call in response to detecting that the mobile device uncouples from the base station. The telecommunication control system can then track the location of the mobile device and communicate with the mobile device as it moves.

In FIG. 3, flow 300 begins at processing block 302, where a telecomm system sends a telephone signal to a mobile device. The flow 300 continues at processing block 304, where the telecom system receives a signal that indicates that the mobile device will remain stationary at a given location during the telephone call. The flow 300 continues at processing block 306, where the telecom system terminates tracking of the location data for the mobile device during the telephone call in response to receiving the signal that indicates that the mobile device will remain stationary at the given location during the telephone call. The flow 300 continues at processing block 308, where the telecom system receives the signal that indicates that the mobile device will no longer remain stationary at the location and, at processing block 310, the telecom system initiates tracking of location data for the mobile device for the telephone call.

FIGS. 4A and 4B illustrate an example of the operations described in flows 200 and 300. In FIG. 4A, at stage "A," a telecommunications control system ("telecom system") 450 detects a telephone signal 414 from a first mobile device 421 (e.g., via a mobile network tower 422) and sends a corresponding telephone signal 415 to a second mobile device 412. The telecom system 450 includes one or more different devices in a mobile network tower and in other nodes of a mobile network, such as devices from a base station subsystem (e.g., as radio base stations, base transceiver stations, base station controllers, etc.), devices from network switching subsystems, devices from a packet switched network, devices from a public switched telephone network, and so forth. The telecom system 450 transmits the telephone signal 415 (i.e., for the telephone signal 414), via a mobile network tower 420, to the mobile device 412. The telephone signal 415 is assigned to the mobile device 412 via an identifier associated with the telephone call (i.e., via a telephone number assigned to the mobile device 412, a mobile device serial number, a SIM card identifier, etc.). The mobile device 412 is linked, via a communications link, with a cordless telephone base station ("base station") 402. The base station 402 is localized to a specific geographic region, such as a home, a business, etc. The broadcast range of the base station 402 is limited, generally, to the specific geographic location, and comports with cordless telephone standards (e.g., personal access system (PAS), digital enhanced cordless telecommunications (DECT), cordless telephone generations (e.g., CT1, CT2, etc.), and so forth).

The telecom system 450 determines that the telephone signal 414 is directed to the mobile device 412 (e.g., determines that a telephone number dialed by the mobile device 421 is assigned to the mobile device 412). Thus the telecom system 450 transmits the corresponding telephone signal 415 to the mobile device 412.

At stage "B," the mobile device 412 links to the base station 402 for communication transfer. In other words, communications intended for the mobile device 412 are transferred to the base station 402, which in turn transfers the communications to the cordless handset 404, and vice versa. For example, upon being linked with the base station 402, the mobile device 412 registers a unique identifier (e.g., a telephone number, a serial number, a SIM card number, etc.) that identifies the mobile device 412 uniquely. In some examples, the mobile device 412 transfers control for telephone communications to the base station 402 (i.e., to communicate directly with telecom system 450). The base station 402 may include antennas, matching SIM cards, etc., that will emulate the mobile device 412. In some embodiments, a portion of operations are performed by the mobile device 412 (e.g., via a processor associated with mobile device 412) and a portion of operations are performed by the base station 402 (e.g., via a processor associated with the base station 402). However, because of their communication link with each other, some (or all) operations performed by the mobile device 412 may instead be performed by the base station 402 and/or the handsets 404 and 405. Therefore, because of the linked relationship between the mobile device 412 and the base station 402, and to keep from having to specify that either may perform specific operations, the discussion below will refer generally to a cordless telephone system 401 performing certain operations that can, in some examples, be performed by the mobile device 412 and/or the base station 402. In other words, in some embodiments, when the mobile device 412 is linked with the base station 402, the combination of the mobile device 412 and the base station 402 may be referred to as the cordless telephone system 401. Therefore, in the description herein, reference to operations performed by the cordless telephone system 401 includes operations performed by either a processor (and/or other hardware or software) of the base station 402, a processor (and/or other hardware or software) of the mobile device 412, or some combination.

Furthermore, at stage "B," the cordless telephone system 401 receives the telephone signal 415 and detects that mobile device 412, assigned to the telephone signal 415, is physically docked at the base station 402. In some examples, the mobile device 412 receives the incoming telephone signal 415 via an antenna associated with the mobile device 412. The base station 402 detects that the mobile device 412 is assigned to the telephone signal 415. For instance, as mentioned previously, upon being linked with the base station 402, the mobile device 412 may have registered a unique identifier that identifies the mobile device 412. The mobile device 412 detects, from the telephone signal 415, an identifier associated with the unique identifier of the mobile device 412. Thus, the mobile device 412 determines that the telephone signal 415 is for the mobile device 412. Upon receiving the telephone signal 415, and determining that it is assigned to the mobile device 412, the mobile device 412 transfers the telephone signal 415 to the base station 402. The base station 402 receives the telephone signal 414, transferred by the mobile device 412. Because the base station 402 determines that any telephone signals transferred from the mobile device 412 are associated with the mobile device 412, the base station 402 can also determine that the telephone signal 415 is associated with the mobile device 412. In other embodiments, however, prior to receiving the telephone signal 415, the mobile device 412 transfers control to the base station 402 to communicate with the telecommunication control system 450. Therefore, in some embodiments, the base station 402 receives the telephone signal 415 and determines that it was intended for the mobile device 412. The base station 402 then initiates communication with the telecommunication control system 450 on behalf of the mobile device 412.

At stage "C," the cordless telephone system 401 transmits a signal 416 that indicates a location of the mobile device 412 at the location associated with the base station 402. The base station 402 and mobile device 412 are stationary. Therefore, unless the user moves the mobile device 412, the base station 402 causes the mobile device 412 to remain physically still. For example, as shown FIG. 4B, the base station 402 may include a docking station 433 with slanting walls that orient, support, and cradle the mobile device 412 in a restrained, physical position so that the mobile device 412 will not move during the telephone call. In some embodiments, the base station 402 includes a fastener 434 that attaches, physically couples, or otherwise keeps the mobile device 412 stationary relative to the base station 402. The fastener 434 may be part of a docking station with a connection port that has physical connection parts that fasten to corresponding physical connection parts of the mobile device 412. In some embodiments, the connection port can allow electronic and/or communicative data exchange via the physical connector (e.g., bottom connectors of a mobile device), in additional to keeping the mobile device stationary. In some embodiments, the fastener 434 does not have electronic and/or communicative data exchange. For instance, the fastener 434 may be a snap, a suction cup, an elastic strap, a prong, a Velcro® patch, a magnet, a cable, a tether, or other such means of keeping the mobile device physically in place during the phone call. In examples where the fastener 434, or other such physical connector, does not have electronic and/or communicative data exchange, communications between the mobile device 412 and the base station 402 can still be conducted wirelessly and/or via another physical connection not associated with the fastener 434. The cordless telephone system 401 can detect that the mobile device 412 is coupled to the base station 402, for instance, by sensors that detect the engaging of fastening parts, or that detect that the mobile device 412 is attached to a specific part of the base station 402 (e.g., detects a magnetic field, a pressure, a weight, an electronic signal, etc. associated with the specific part of the base station 402 where the mobile device 412 is attached). In some embodiments, the base station 402 includes fasteners that attach the base station to a wall, furniture, or some other stationary item at the location where the base station 402 is located.

At stage "D," after sending the signal 416, the cordless telephone system 401 terminates tracking (e.g., refrains from generating, sending, or receiving) location data for the mobile device 412 with the telecommunication control system 450. Telephone calls made within a mobile network usually include location data that indicates the precise location of the mobile device 412 during a telephone call so that the radio signals are precisely directed to the mobile device 412. However, if the mobile device 412 is stationary, and the cordless telephone system 401 will not move for at least a portion of the telephone call, then the cordless telephone system 401 sends the signal 416 to indicate to the telecommunication control system 450 that location tracking is not necessary while the mobile device 412 is stationary. Because the mobile device 412 will remain stationary during at least a portion of the telephone call, radio communications with the mobile network tower 420 can use similar transmission vectors during the portion of the telephone call because the location of the mobile device 412 and/or the base station 402 remain fixed at the location of the base station 402 and, consequently, antennas of the mobile device 412 and/or the base station 402, which receive or transmit telecommunication signals during the telephone call, are also fixed at the location. The base station 402 may be configured to convert a mobile telephone signal into a cordless telephone signal, which the base station 402 then communicates to the handsets 404 and 405. In the example of FIG. 4A, the handset 404 receives the telephone call and conducts the telephone call. The handset 404 is mobile at the geographic location associated with the base station 402. However, telephone signals communicated between the telecom system 450 and the cordless telephone system 401 are sent to either the base station 402 and/or the mobile device 412, which are stationary.

At stage "E," the telecommunication control system 450 receives the signal 416 that indicates that the mobile device 412 will remain stationary at the given location during the telephone call. The telecommunication control system 450 can send a response signal that indicates that signal 416 was received. In some embodiments, the cordless telephone system 401 can wait to terminate the tracking of the location data until receiving a response from the telecommunication control system 450 that it received the signal 416. The telecommunication control system 450 then terminates tracking (e.g., refrains from generating, sending, or receiving) location data for the mobile device 412 during the telephone call until further notice.

In FIG. 4B, at stage "G," the cordless telephone system 401 detects that mobile device 412 undocks from the base station 402 during the telephone call. At stage "H," the cordless telephone system 401 sends a signal 417 that indicates that the mobile device 412 will no longer remain stationary at the location during the telephone call. At stage "I," in response to determining that the mobile device 412 undocks, physically, from the base station 402, the mobile device 412 initiates tracking of location data for the mobile device 412 for the telephone call. In some embodiments, even though the mobile device 412 undocks from the base station 402, the mobile device 412 and the base station 402 may remain wirelessly linked (e.g., via Bluetooth®). In other words, the mobile device 412 may continue to send telephone signals to the base station 402, which the base station 402 may continue to send to the handset 404. In other embodiments, however, the base station 402 may terminate communications with the handset 404 as soon as the mobile device 412 undocks from the base station 402.

In some embodiments, the cordless telephone system 401 may detect events associated with the handset 404, during the telephone call, which indicate a trigger to reinitiate tracking of location date for the mobile device 412. For example, in response to a button being pressed on the handset 404 or in response to the handset 404 being physically docked at the base station during the telephone call, the cordless telephone system 401 can send the signal 417.

At stage "J," the telecommunication control system 450 receives the signal 417 that indicates that the mobile device 412 will no longer remain stationary at the location associated with the base station 402. At stage "K," in response to receiving the signal 417, the telecommunication control system 450 initiates tracking of location data for the mobile device 412 for the telephone call.

Figure 5:
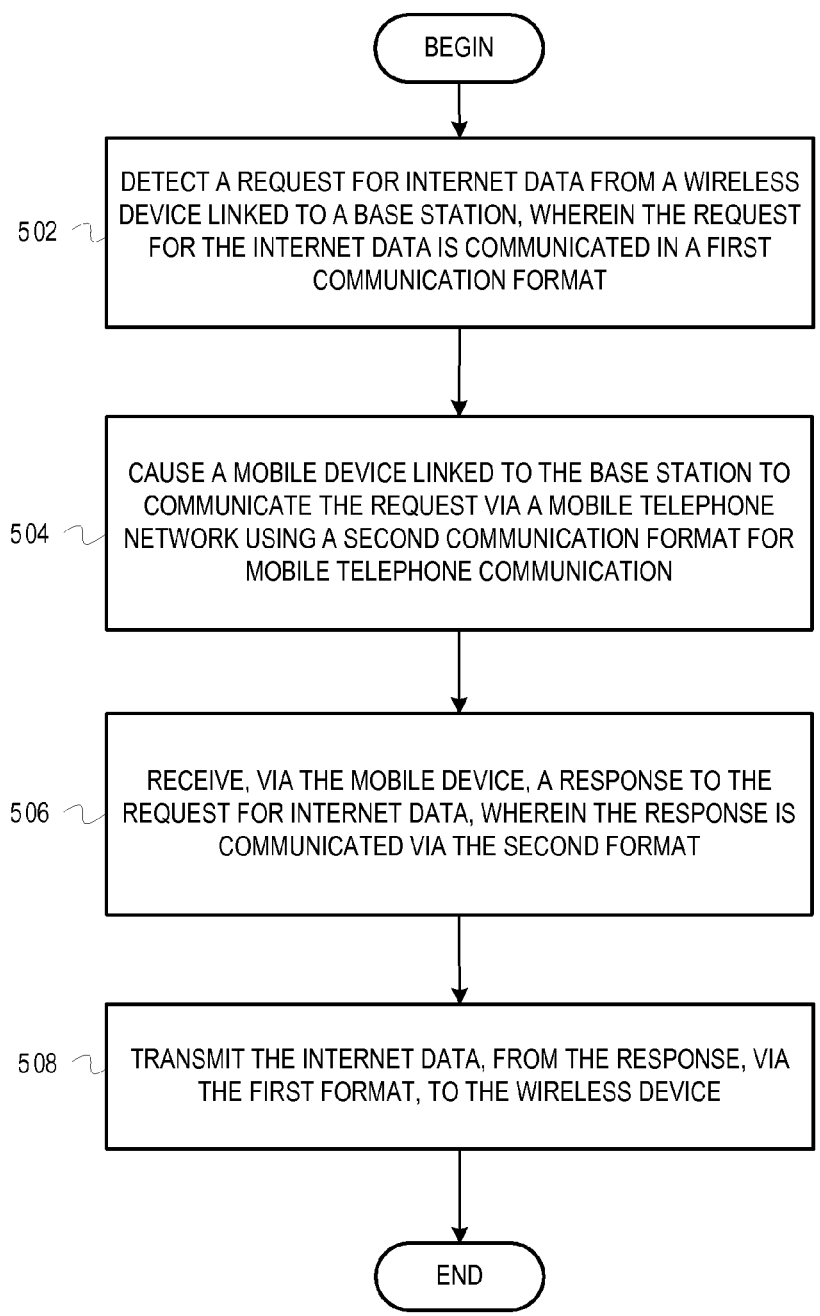
FIG. 5 is an example flow diagram illustrating providing internet access through a base station using one or more linked mobile devices.
Figure 6:
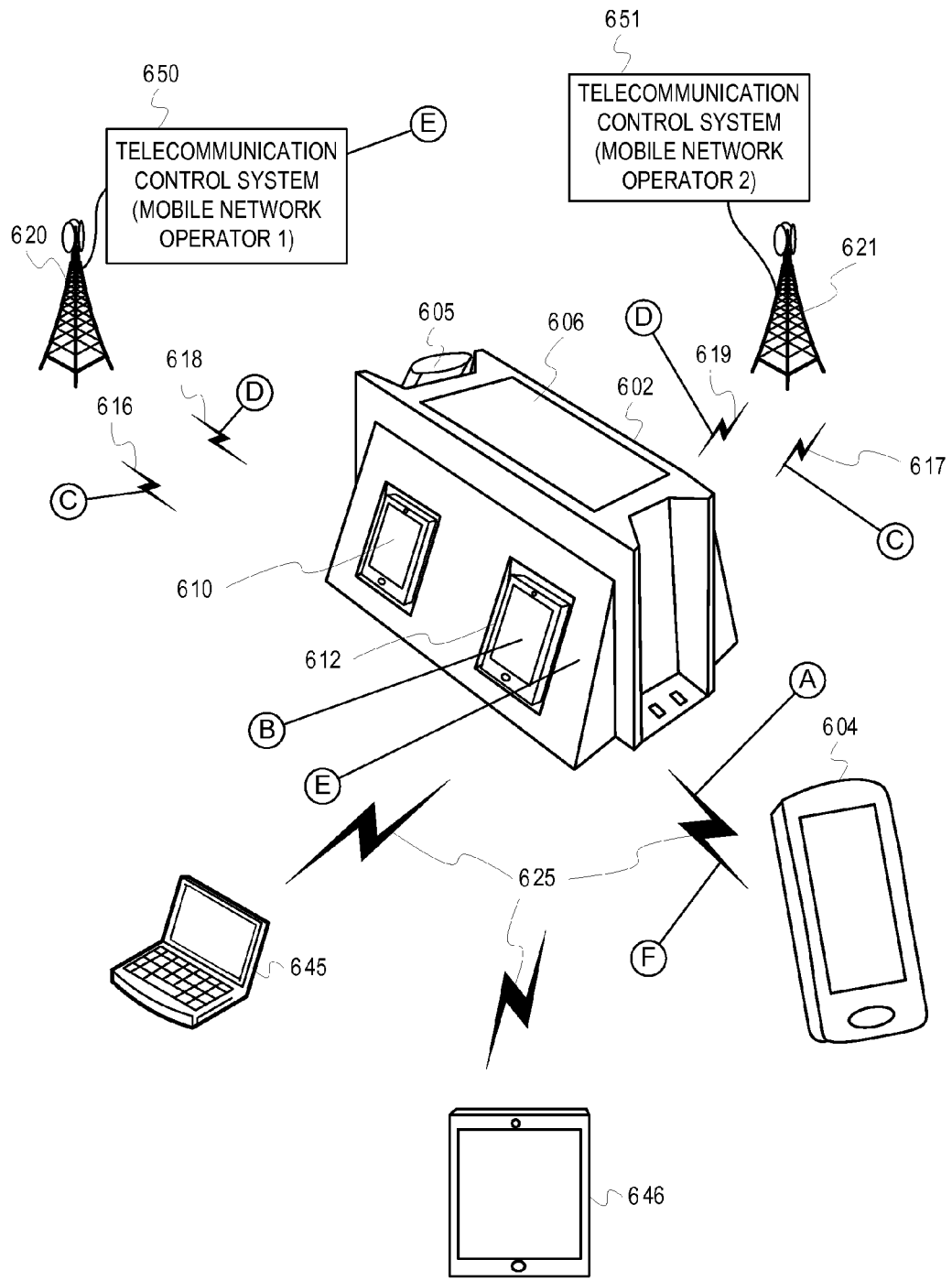
FIG. 6 is an example illustration of providing internet access through a base station using one or more linked mobile devices.

FIG. 5 is an example flow diagram ("flow") 500 illustrating providing internet access through a base station using one or more linked mobile devices. FIG. 6 is an illustration of an example of the operations described in FIG. 5. This description will describe FIG. 5 and FIG. 6 in concert. In FIG. 5, the flow 500 begins at processing block 502, where a telephone system ("system") detects a request for internet data from a wireless device linked to a base station, wherein the request for the internet data is communicated in a first communication format. For example, in FIG. 6, at stage "A," a cordless telephone base station ("base station") 602 links with two mobile devices 610 and 612. A variety of additional devices may also be linked to the base station 602, such as cordless handsets 604 and 605, a laptop 645, a tablet computer 646, a television (not shown), etc. Mobile devices 610 and 612 each have internet access via one or more mobile-network operators or wireless service providers. The mobile devices 610 and 612 have applications, such as web browsers, that can receive and present internet data via a graphical interface. Internet data is data for presentation via an internet browser, such as data that makes up web pages, internet video/audio streaming, etc. Internet data is accessible via an internet access service provided by a mobile-network operator or wireless service provider. Any of the additional devices may also include a browser application. For example, when a user launches a browser application via the cordless handset 604 and requests to access an internet address (e.g., via a Uniform Resource Location, or "URL," address field in the browser), the browser application requests to access web content for that internet address. Therefore, at stage "A," the cordless handset 604 sends a request (e.g., a signal 625) in a first format for communication via a local network (e.g., a radio signal format for cordless telephone communication, a Wi-Fi format, etc.) to the base station 602. In some embodiments, communications via a local network utilize a communication standard based on IEEE 802.11 standards or "Wi-Fi." In some examples communications between the base station 602 and the cordless handset 604 occur via cordless telephone communication formats, such as the personal access system (PAS), digital enhanced cordless telecommunications (DECT), cordless telephone generations (e.g., CT1, CT2, etc.), and so forth.

Returning momentarily to FIG. 5, the flow 500 continues at processing block 504, where the system causes a mobile device linked to the base station to communicate the request for the internet data via a mobile telephone network using a second communication format for mobile telephone communication. For example, in FIG. 6, at stage "B," the base station 602 requests at least one of the mobile devices (e.g., mobile device 612) to obtain the internet data via its respective mobile network operator according to the request made by the handset 604. For example, the mobile device 612 receives the request from the base station 602 and, at stage "C," sends a mobile-network radio signal 616, in a second format, to telecommunication control system 650 via the mobile network tower 620. The telecommunication control system 650 processes the request and, at stage "D," sends a signal 618 that includes internet data for the web content requested originally by the handset 604. The telecommunication control system 650 sends the signal 618 via mobile-network radio signals.

Returning momentarily to FIG. 5, the flow 500 continues at processing block 506, where the system receives, via the mobile device, a response to the request for internet data, wherein the response is communicated via the second format. For example, in FIG. 6, at stage "E," the mobile device 612 receives the signal 618 that includes internet data and provides the internet data to the base station 602.

Returning momentarily to FIG. 5, the flow 500 continues at processing block 508, where the system transmits the internet data, from the response, via the first format, to the wireless device. For example, In FIG. 6, at stage "F," the base station 602 transmits the internet data to the handset 604 (and/or to any other linked devices) in the first format of the location network (e.g., in the cordless telephone communication format, in the local-area-network format, etc.). The handset 604 then presents the internet data via the web browser.

In some embodiments, the base station 602 sends a request to both of the mobile devices 612 and 610 to access their respective internet providers and obtain internet data simultaneously. In other words, when the mobile device 612 communicates with the telecommunication control system 650, the mobile device 610 communicates with the telecommunication control system 651 via mobile network tower 621 (i.e., the mobile device 610 sends signal 617 and receives signal 619). The telecommunication control system 651 may be associated with a second wireless service provider different from the wireless service provider associated with the telecommunication control system 650. In some embodiments, the mobile devices 610 and 612 can utilize the same wireless service provider (e.g., via the same telecommunication control system). Furthermore, in some embodiments, the mobile devices 610 and 612 can receive signals 616 and 617 from the same mobile network tower instead of from different mobile network towers. In some embodiments, when the mobile devices 610 and 612 both provide internet access, the base station 602 can increase the internet data bandwidth provided to the linked devices (e.g., to the laptop 645, the tablet computer 646, the handset 604, etc.). The linked devices can present the internet data at a quicker rate using the increased bandwidth. A user interface 606 on the base station can also present internet data via a web browser. Both mobile devices 610 and 612 simultaneously contribute to the bandwidth for the base station 602. As stated previously, in some embodiments, the mobile devices 610 and 612 do not need to be physically docked with the base station 602. If the mobile devices 610 or 612 are physically docked, then location tracking can be terminated from the stationary mobile devices 610 and 612 while docked, thus eliminating the need to communicate location data and, consequently, further increasing the available bandwidth.

Figure 7:
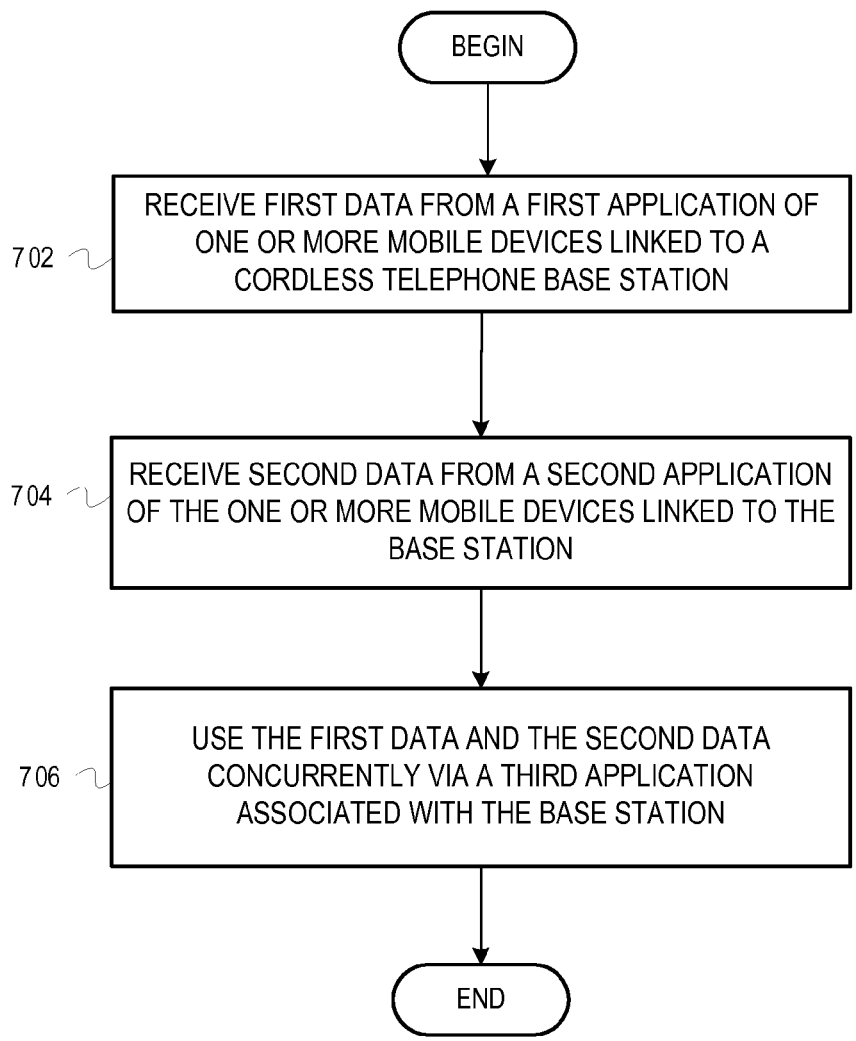
FIG. 7 is an example flow diagram illustrating using data from mobile devices via a base station.
Figure 8:
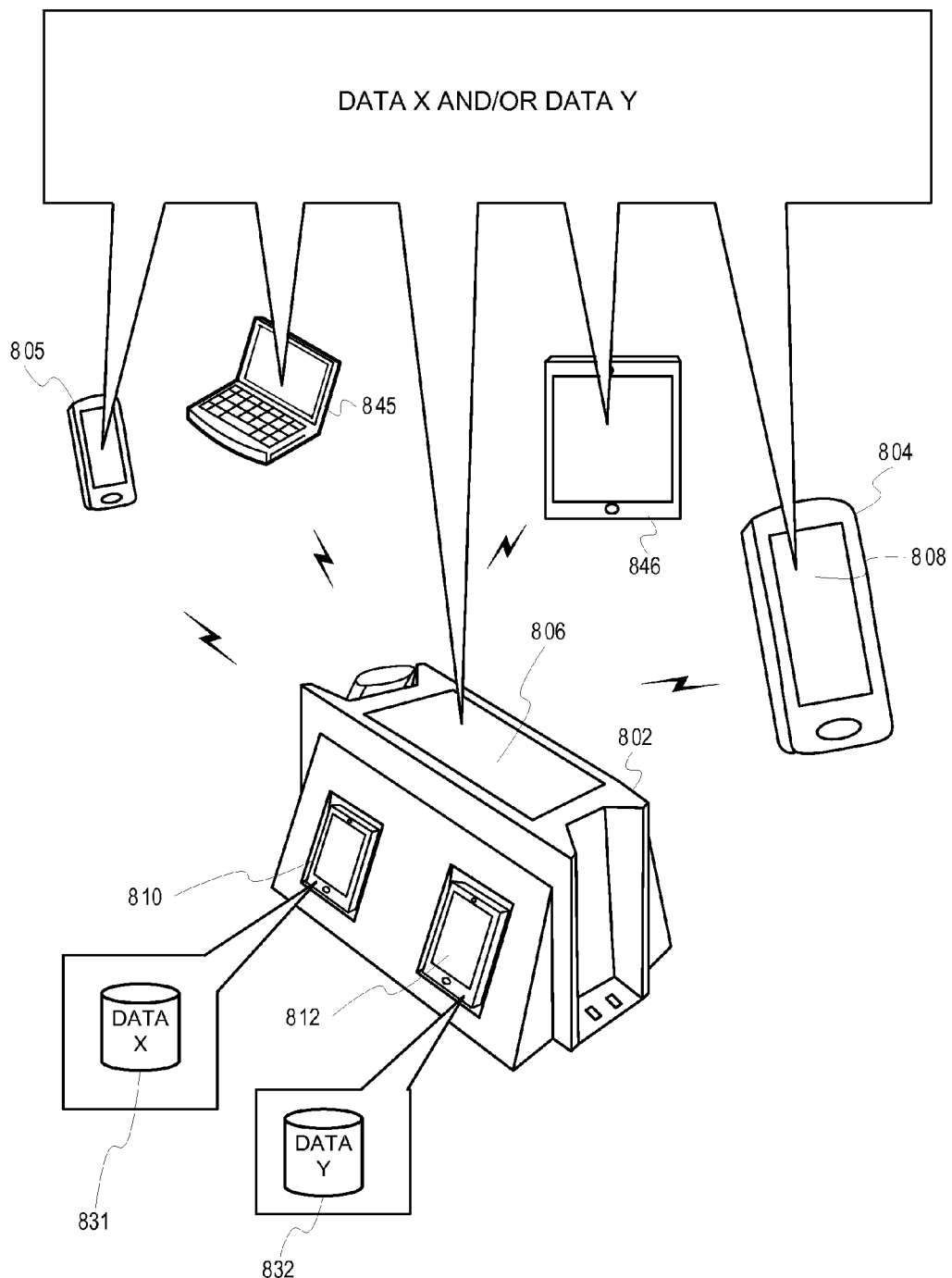
FIG. 8 is an example illustration of using data from mobile devices via a base station.

FIG. 7 is an example flow diagram ("flow") 700 illustrating using data from mobile devices via a base station. FIG. 8 is an illustration of an example of the operations described in FIG. 7. This description will describe FIG. 7 and FIG. 8 in concert. In FIG. 7, the flow 700 begins at processing block 702, where a telephone system ("system") receives first data from a first application of one or more mobile devices linked with a base station. For example, in FIG. 8, a cordless telephone base station ("base station") 802 reads data 831 from a mobile device 810. The data 831 includes any kind of data used via any of the applications of the mobile device 810, such as configuration data, email data, contact data, calendar data, internet data, phone settings, application data, system data, user data, control data, etc. In some embodiments, the data includes applications, files, media, or other such information.

Returning momentarily to FIG. 7, the flow 700 continues at processing block 704, where the system receives second data from a second application of the one or more mobile devices linked to the base station. For example, in FIG. 8, the base station 802 reads data 832 from a mobile device 812. The data 832 includes any kind of data used via any of the applications of the mobile device 812. The data 832 is similar to the data 831 and can be, by way of example, configuration data, email data, contact data, calendar data, internet data, phone settings, application data, system data, user data, control data, applications, files, media, or other such information. The data 831 and 832 are stored separately on each of the mobile devices 810 and 812. In some embodiments, the base station 802 reads the data 831 and 832 concurrently from both of the mobile devices 810 and 812.

Returning momentarily to FIG. 7, the flow 700 continues at processing block 706, where the system presents the first data and the second data concurrently via a third application associated with the base station. For example, in FIG. 8, the base station 802 can receive the data 831 and 832 and aggregate the data 831 and 832 for use via one application of the base station 802 (e.g., via an interface 806) or of any device linked to the base station 802, such as handsets 804 and 805, a laptop 845, a tablet computer 846, or one of the mobile devices 810 or 812 (e.g., mobile device 810 or 812 receives aggregated data that was originally obtained from the data 831 and 832). For example, the handset 804 includes a contact application that indicates contact data for callers who call through either of the mobile devices 810 or 812. The handset 804 launches the contact application and presents it via an interface 808. When a call is received, for example, via mobile device 810, the base station 802 detects, from the data 831, that the incoming telephone number is associated with a given contact stored on the mobile device 810 within the data 831. The base station 802, therefore, provides to the handset 804 contact information (e.g., name and telephone number) for the contact. The contact application of the handset 804 presents the information about the contact. A user of the handset 804 accesses the contact application via the interface 808 to look for additional information about the contact, such as the contact's email address, home address, business telephone number, nickname, or any other type of information stored in a contact application. The data 831 may include only the name and telephone number for the contact. However, the data 832 may include additional data about the contact that is not included in the data 831, such as an email address. Because the mobile device 812 is linked with the base station 802, then the base station 802 can provide any information about the contact (e.g., the email address) from the data 832. Thus, mobile devices 810 and 812 are data stores for any application run by the base station 802 and/or linked devices to the base station 802. The handset 804, therefore, can use the additional information (e.g., the email address) to send an email from the handset 804 (e.g., via an email application for the handset 804), to the contact via the mobile device 810. In some embodiments, in response to the base station 802 detecting that some of the data included in the data 832 is not included in the data 831, the base station 802 may also be configured to write some of the data 832 to the data 831 (e.g., the data that was used by the base station 802 that is missing from the data 831, and vice versa). For example, when handset 804 used the email address of the contact, the base station 802 writes the email address from the data 832 to the data 831.

In some embodiments, the base station 802 accesses an application store associated with one of the mobile devices 810 or 812 and provides an application to the other mobile device or to any of the linked devices, such as to the tablet computer 846, the handsets 804 and 805, or the laptop 845.

It should be understood that the devices and operations described herein (e.g., in FIGS. 1-8) are examples meant to aid in understanding embodiments and should not be used to limit embodiments or limit scope of the claims. Embodiments may perform additional operations, fewer operations, operations in a different order, operations in parallel, and some operations differently. According to some embodiments, telephone system ("system") can provide various additional example devices, operations, etc., to control communications between a mobile device and a base station (e.g., a cordless telephone base station). The following non-exhaustive list enumerates some possible additional embodiments.

In some examples, the base station can provide power to a mobile device when the mobile device is physically docked with the base station (e.g., via a physical power connector or via wireless charging).

In another example, when the base station receives a telephone call, the base station can identify which of a plurality of mobile devices received the telephone call and ring with a ringtone that is matched to the particular one of the mobile devices. In other words, the base station is configured to have different ring sounds that uniquely identify which of the mobile devices received the telephone call.

In another example, the base station can have a combined voice mail for any or all linked mobile devices. In another example, the base station can transfer a call from one of the handset to another or to another mobile device.

In another example, the base station can transfer a call back to the one of the mobile device that originally received the call (e.g., if the call originally was received via mobile device, if the user undocks the mobile device from the base station during the phone call, then the base station instantly transfers the call to the mobile device).

In another example, the base station can enable call waiting if another call comes in from a landline or from any of the mobile devices (e.g., after the mobile device receives a call and transfers the call to one of the handsets, while the first call is in progress, if a second call comes in to the mobile device, then any of the handset in use produce a beeping sound to indicate a call waiting for the second call, and in some examples, may also present the number associated with the second call for call waiting caller ID).

In another example, the base station can conference together multiple telephone calls that are concurrently received at the base station from multiple linked mobile devices (e.g., conference together calls that were received independently from mobile devices linked with the base station).

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Figure 9:
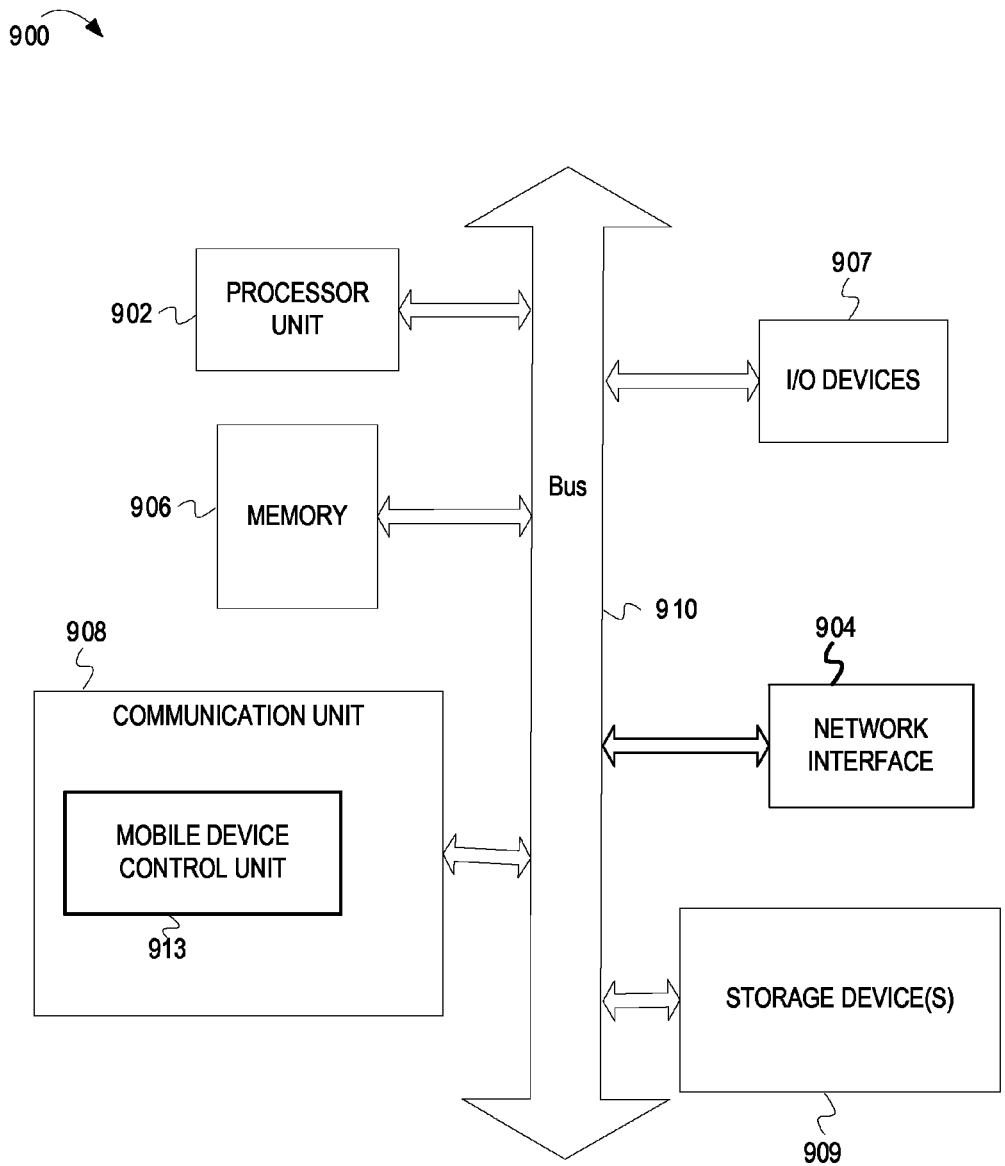
FIG. 9 is an illustration of an example electronic device.

FIG. 9 is a block diagram of one embodiment of an electronic device 900. In some embodiments, the electronic device 900 can be a cordless telephone base station. The electronic device 900 includes a processor unit 902 (possibly including multiple processors, multiple cores, multiple nodes, and/or implementing multi-threading, etc.). The electronic device 900 includes a memory unit 906. The memory unit 906 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable storage media. The electronic device 900 also includes a bus 910 (e.g., PCI, ISA, PCI-Express, HyperTransport®, InfiniBand®, NuBus, AHB, AXI, etc.), and network interfaces 904 that include at least one of a wireless network interface (e.g., a WLAN interface, a Bluetooth® interface, a WiMAX interface, a ZigBee® interface, a Wireless USB interface, etc.) and a wired network interface (e.g., a powerline communication interface, an Ethernet interface, etc.) that connect the electronic device 900 to a corresponding communication network.

The electronic device 900 also includes a communication unit 908. The communication unit 908 comprises a mobile device control unit 913 and, in some examples, an additional dedicated processor and memory. In some embodiments, the communication unit 908 and the processor unit 902 can implement the functionality described above with reference to FIGS. 1-8 to control communications between a mobile device and a base station. For example, in some embodiments, the mobile device control unit 913 is configured to establish a communication link between one or more mobile devices and a base station (e.g., wirelessly, via a wired connection, etc.). In some examples, the mobile device control unit 913 is configured to communicate information between the base station and one or more mobile devices, such as information associated with telephone calls, applications, internet access, etc. Any one of these functionalities may be partially (or entirely) implemented in hardware and/or on the processor unit 902. For example, the functionality may be implemented with an application specific integrated circuit, in logic implemented in the processor unit 902, in a co-processor on a peripheral device or card, etc. Further, realizations may include fewer or additional components not illustrated in FIG. 9 (e.g., video cards, audio cards, additional network interfaces, peripheral devices, etc.). For example, the communication unit 908 may comprise one or more additional processors that are distinct from the processor unit 902 coupled with the bus 910. The processor unit 902, the memory unit 906, and the network interfaces 904 are coupled to the bus 910. Although illustrated as being coupled to the bus 910, the memory unit 906 may be coupled to the processor unit 902. In some embodiments, the electronic device 900 includes input and/or output devices ("I/O devices") 907. The I/O devices 907 can be used, for example, to connect to a mobile device. In some embodiments, the electronic device 900 may also include one or more storage devices ("storage device(s)") 909.

While the embodiments are described with reference to various implementations and exploitations, it will be understood that these embodiments are illustrative and that the scope of the inventive subject matter is not limited to them. In general, techniques for controlling communications between a mobile device and a base station as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for mobile communications, the method comprising:
   establishing a communication link between a mobile device and a cordless telephone base station via a local network;
   determining, at the cordless telephone base station via the communication link, initiation of a telephone call in response to a first communication signal received by the mobile device via a mobile network, wherein the mobile network is different from the local network;
   determining, at the cordless telephone base station, that the mobile device is stationary in response to determining the initiation of the telephone call; and
   transmitting a second communication signal from the cordless telephone base station to a telecommunication control system of the mobile network in response to determining that the mobile device is stationary, wherein the second communication signal indicates to the telecommunication control system to terminate location tracking of the mobile device within the mobile network during at least a portion of the telephone call while the mobile device remains stationary.

2. The method of claim 1 further comprising:
   receiving, at the cordless telephone base station, the first communication signal from the mobile device;
   converting, via the cordless telephone base station, the first communication signal from a first communication format used for mobile network communications to a second communication format for use with a telephone handset of the cordless telephone base station, wherein the telephone handset is different from the mobile device; and transmitting the first communication signal from the cordless telephone base station to the telephone handset after converting the first communication signal.

3. The method of claim 1, wherein the transmitting the second communication signal comprises transmitting the second communication signal to an address associated with the telecommunication control system, wherein the telecommunication control system implements the location tracking of the mobile device for a mobile network operator associated with the mobile device.

4. The method of claim 1, wherein the determining that the mobile device will remain stationary during at least the portion of the telephone call comprises at least one member of the group consisting of detecting that the mobile device is located within a physical docking station of the cordless telephone base station, and detecting that the mobile device is fastened to the cordless telephone base station.

5. The method of claim 1, wherein the establishing the communication link comprises associating a unique identifier of a first subscriber identification mode (SIM) card of the mobile device to a second SIM card of the cordless telephone base station.

6. The method of claim 1, wherein the communication link enables an exchange of communications between the mobile device and the cordless telephone base station via the local network.

7. The method of claim 1, wherein the local network comprises at least one member of the group consisting of a cordless telephone network, and a Wi-Fi network.

8. The method of claim 1, wherein the second communication signal indicates to the telecommunication control system to terminate the location tracking of the mobile device within the mobile network until a third communication signal is sent from the cordless telephone base station to the telecommunication control system to resume the location tracking of the mobile device within the mobile network.

9. The method of claim 1, wherein the determining that the mobile device is stationary comprises determining that the mobile device is docked to the cordless telephone base station, and further comprising generating the second communication signal to indicate to the telecommunication control system that the mobile device is docked to the cordless telephone base station.

10. The method of claim 1, wherein the second communication signal indicates to the telecommunication control system to refrain from performing operations comprising at least one member of the group consisting of generating location data associated with the mobile device, sending location data associated with the mobile device, and receiving location data associated with the mobile device.

11. The method of claim 1, wherein the mobile device receives telecommunication data via the mobile network during the at least the portion of the telephone call, wherein the telecommunication data does not include location data.

12. A non-transitory, machine-readable storage medium having instructions stored thereon, which when executed by a processor of a cordless telephone base station, cause the cordless telephone base station to:
establish a communication link between a mobile device and the cordless telephone base station via a local network;
detect a first communication signal from the mobile device that indicates receipt of a telephone call by the mobile device via a mobile network, wherein the mobile network is different from the local network;
determine that the mobile device is physically coupled with the cordless telephone base station in response to receiving the first communication signal, wherein the mobile device remains stationary during at least a portion of the telephone call while the mobile device is physically coupled with the cordless telephone base station; and
transmit, from the cordless telephone base station to a telecommunication control system of the mobile network, a second communication signal in response to determination that the mobile device is physically coupled with the cordless telephone base station, wherein the second communication signal indicates to the telecommunication control system to terminate location tracking of the mobile device within the mobile network during at least the portion of the telephone call while the mobile device remains physically coupled with the cordless telephone base station.

13. The non-transitory, machine-readable storage medium of claim 12, wherein the instructions executed by the processor cause the cordless telephone base station to transmit the second communication signal to an address associated with the telecommunication control system, wherein the telecommunication control system implements the location tracking of the mobile device for a mobile network service provider associated with the mobile device.

14. The non-transitory, machine-readable storage medium of claim 12, wherein the cordless telephone base station physically couples the mobile device to the cordless telephone base station via at least one member of the group consisting of: a physical docking station of the cordless telephone base station; and a fastener that attaches the mobile device to the cordless telephone base station.

15. The non-transitory, machine-readable storage medium of claim 12, wherein the instructions executed by the processor cause the cordless telephone base station to associate a unique identifier of a first SIM card of the mobile device to a second SIM card of the cordless telephone base station.

16. The non-transitory, machine-readable storage medium of claim 12, wherein the communication link enables Internet data communication between the mobile device and the cordless telephone base station via the local network.

17. The non-transitory, machine-readable storage medium of claim 12, wherein the instructions executed by the processor further cause the cordless telephone base station to:
transfer the first communication signal for the telephone call from the mobile device to the cordless telephone base station; and
convert, at the cordless telephone base station, the first communication signal from a first communication format used for mobile network communications to a second communication format for use with a telephone handset of the cordless telephone base station, wherein the telephone handset is different from the mobile device.

18. The non-transitory, machine-readable storage medium of claim 12, wherein the second communication signal indicates that the mobile device is physically docked for at least the portion of the telephone call.

19. A system comprising:
a processor; and
a memory to store instructions which, when executed by the processor, cause the system to,
establish a communication link between a mobile device and a cordless telephone base station via a local network,
determine that a first communication signal for a telephone call is received by the mobile device from a mobile network, wherein the mobile network is different from the local network, determine that the mobile device is physically coupled with the cordless telephone base station in response to receipt of the first communication signal for the telephone call, wherein the mobile device remains stationary during at least a portion of the telephone call while the mobile device is physically coupled with the cordless telephone base station, and transmit a second communication signal from the cordless telephone base station to a telecommunication control system, via the mobile network, in response to determination that the mobile device is physically coupled with the cordless telephone base station, wherein the second communication signal indicates to the telecommunication control system to terminate location tracking of the mobile device within the mobile network during the at least the portion of the telephone call while the mobile device remains physically coupled with the cordless telephone base station.

20. The system of claim 19, wherein the instructions, when executed by the processor, cause the system to transmit the second communication signal to an address associated with the telecommunication control system, wherein the telecommunication control system is associated with a mobile telephone service provider of the mobile device.

21. The system of claim 19, wherein the cordless telephone base station physically couples the mobile device to the cordless telephone base station via at least one member of the group consisting of a physical docking station of the cordless telephone base station, and a fastener that attaches the mobile device to the cordless telephone base station.

22. The system of claim 19, wherein the instructions, when executed by the processor, cause the system to associate a unique identifier of a first SIM card of the mobile device to a second SIM card of the cordless telephone base station.

23. The system of claim 19, wherein the communication link enables data communication between the mobile device and the cordless telephone base station via the local network.

24. The system of claim 19, wherein the instructions, when executed by the processor, further cause the system to:
transfer the first communication signal from the mobile device to the cordless telephone base station; and
convert the first communication signal from a first communication format used for mobile network communications to a second communication format for use with a telephone handset of the cordless telephone base station, wherein the telephone handset is different from the mobile device.

25. The system of claim 19, wherein the second communication signal indicates that the mobile device is docked with the cordless telephone base station for the at least the portion of the telephone call.

* * * * *